Figure 1:
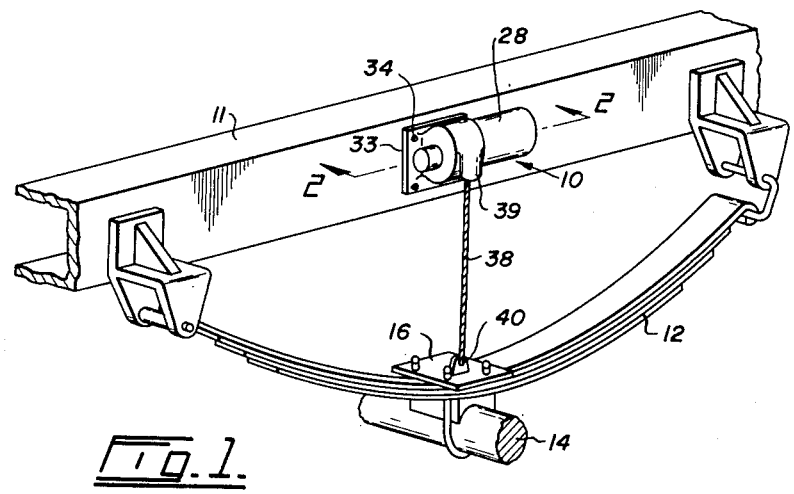

Jan. 26, 1965  A. C. MENEELY  3,167,142
SELF-COMPENSATING LOAD INDICATOR APPARATUS
Filed Aug. 23, 1963  6 Sheets-Sheet 1

INVENTOR
ALLAN C. MENEELY
BY
Fetherstonhaugh & Co.
ATTORNEYS

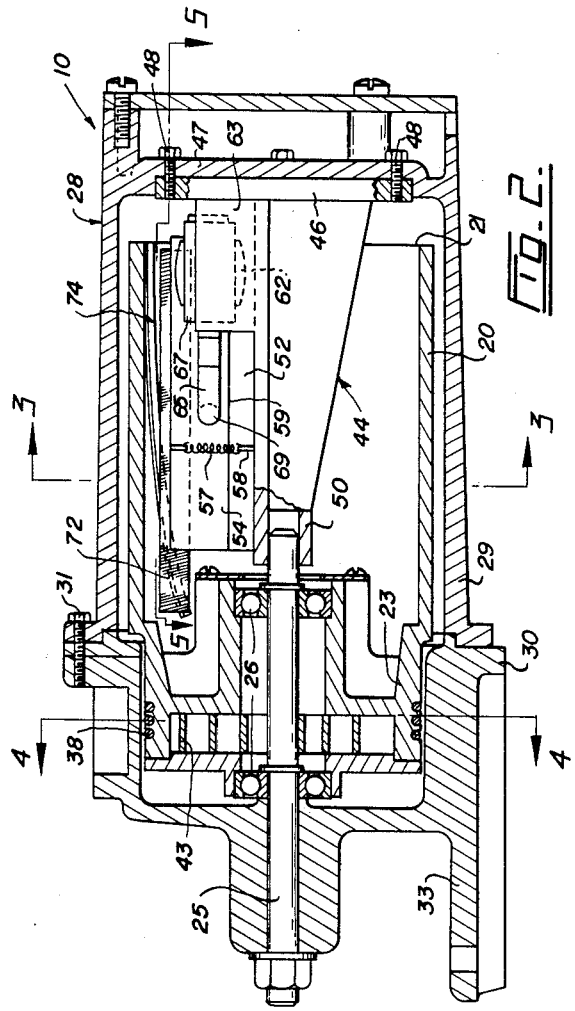

Jan. 26, 1965    A. C. MENEELY    3,167,142
SELF-COMPENSATING LOAD INDICATOR APPARATUS
Filed Aug. 23, 1963    6 Sheets-Sheet 3
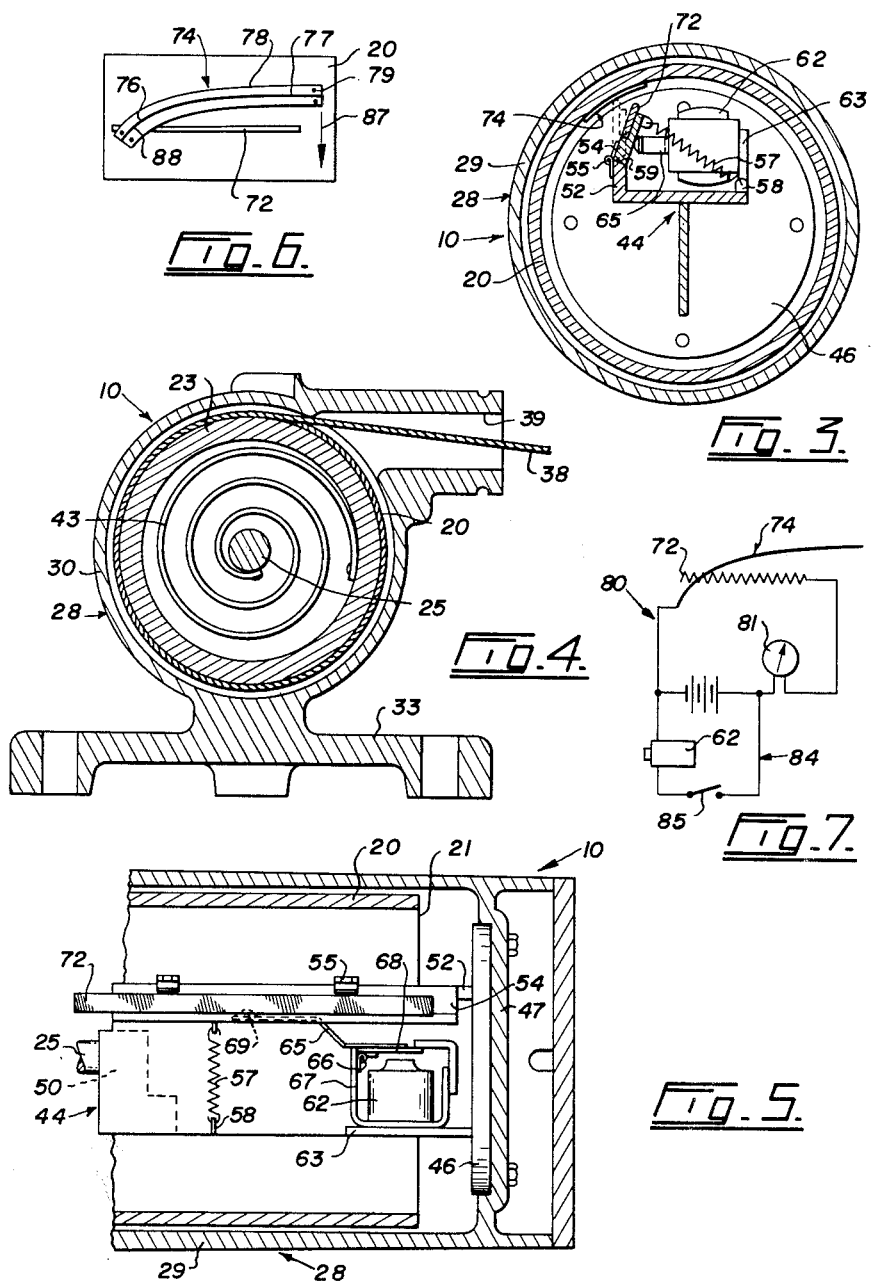
INVENTOR.
ALLAN C. MENEELY
BY
*Fetherstonhaugh & Co.*
ATTORNEYS

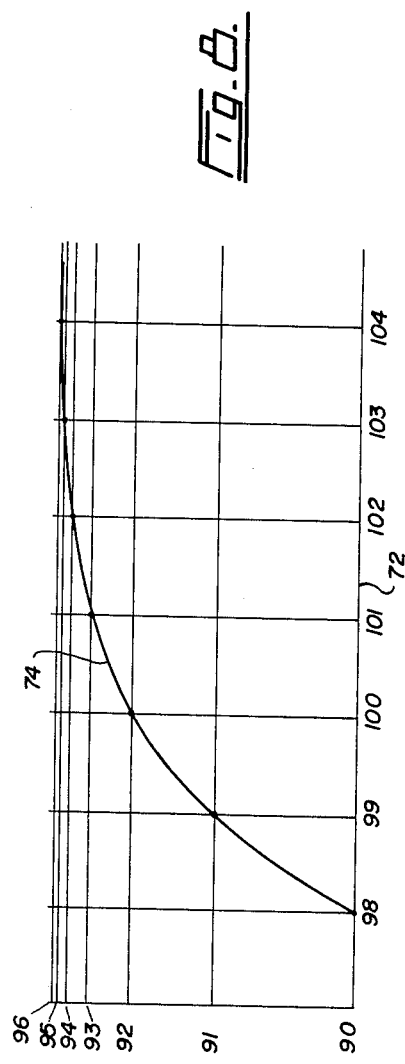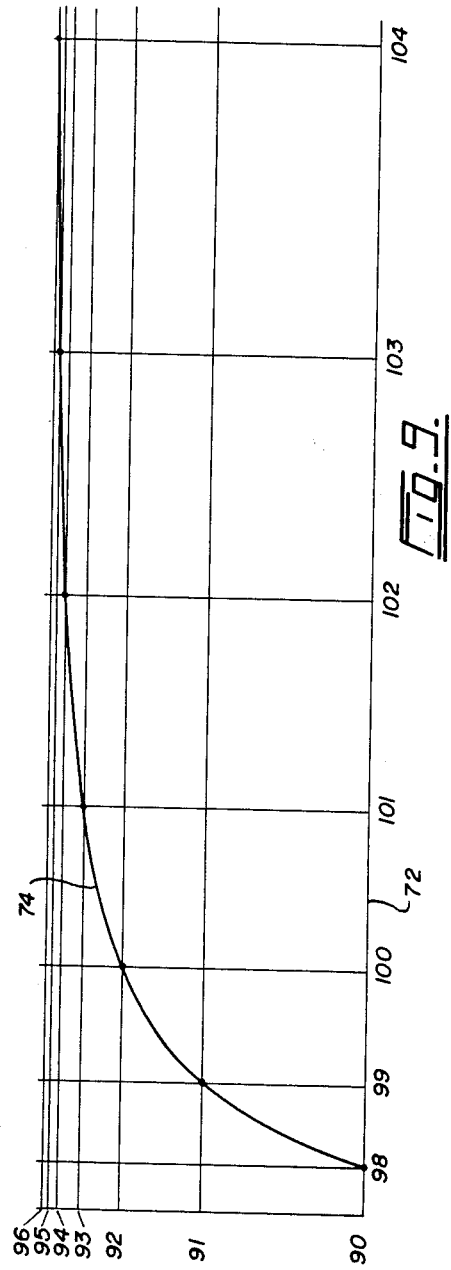

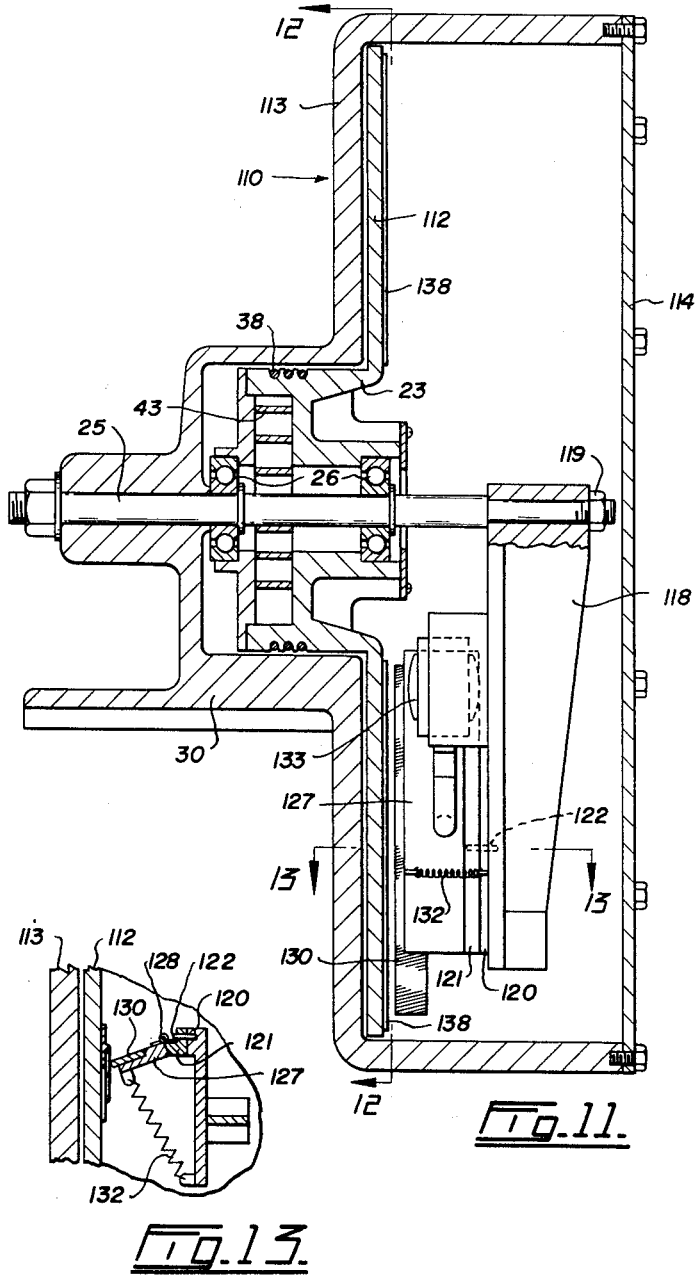

Jan. 26, 1965  A. C. MENEELY  3,167,142
SELF-COMPENSATING LOAD INDICATOR APPARATUS
Filed Aug. 23, 1963  6 Sheets-Sheet 6

INVENTOR
ALLAN C. MENEELY
BY
Fetherstonhaugh & Co.
ATTORNEYS

United States Patent Office 3,167,142
Patented Jan. 26, 1965

3,167,142
SELF-COMPENSATING LOAD INDICATOR APPARATUS
Allan C. Meneely, West Vancouver, British Columbia, Canada, assignor to Pacific Coast Research & Development Ltd., Vancouver, British Columbia, Canada, a corporation of Canada
Filed Aug. 23, 1963, Ser. No. 304,150
25 Claims. (Cl. 177—137)

This invention relates to apparatus for indicating the loads on vehicles.

Trucks and other vehicles travelling on highways are limited as to the entire load of the vehicle and the load on each axle thereof. As a result of this, it is desirable to know when the load reaches the maximum point. This is particularly necessary for people engaged in the business of hauling freight. They need to get the maximum load on the truck for each trip, and yet they must not go over the load limit since these trucks are frequently checked along the highways.

There are devices in existence for indicating the loads of motor vehicles in an effort to help the operator get the maximum load without exceeding the upper limit. However, the known devices are not practical, especially for vehicles capable of carrying heavy loads, because of the fact that the amount of deflection of the springs per unit of load is very much less as the load of the vehicle increases than it is at the beginning of the loading operation. Thus, the springs deflect very little for the last unit of load, say, for example, the last 100 pounds. The first 10 percent of a given load deflects the springs considerably more than the last 10 percent. In other words, the last 100 pounds of a maximum load deflects the springs extremely little, and with heavy duty springs, this makes it almost impossible to measure or indicate the amount of deflection of the springs during the last part of the loading of the truck, and this is the most important time to check the weight of the load on the truck. This weight is not necessarily indicated in pounds, but by its relativity to the maximum load of the truck. Efforts have been made to magnify the amount of deflection of the springs. However, in order to magnify the deflection of the springs as they approach the maximum load limit, it would have to be so much for practical purposes that the magnification at the beginning of the load operation is out of all reasonable proportions. The reason for this is that the magnification is accomplished by means of levers, gears, or some other form of mechanical movement which introduces the same magnification throughout the entire load range. In fact, the last amount of deflection of the springs is so small that the prior art devices have not been able to indicate the last units of load is a manner sufficient for practical use.

The present invention overcomes the drawbacks of the prior devices by providing means for magnifying the deflection of the springs, and automatically increasing the amount of magnification as the loading of the springs progresses. Furthermore, this apparatus is such that the increasing magnification of the spring deflection may be in accordance with the designed deflection of the particular springs in association with which the apparatus is used.

The apparatus may be used between the frame and a portion of the spring of a vehicle or some part connected to the spring, or it may be used in association with a block or support upon which the front end of a truck trailer may be rested. In any case, the apparatus is used with first and second members retained apart by resilient means and relatively movable under the influence of a load, said resilient means being such that the relative movement of the members toward each other becomes less per unit of load as the load increases. The apparatus comprises an elongated resistance strip associated and movable with the first member, a contact strip associated and movable with the second member, said contact strip extending angularly across and longitudinally of and contacting the resistance strip, said contact and resistance strips being positioned so that one strip moves throughout the length thereof in a direction substantially normal to one of the strips when there is relative movement between the first and second members, an electrical measuring circuit, and means for connecting said contact and resistance strips in series in the measuring circuit, the amount of movement of the contact between the contact and resistance strips along said resistance strip during relative movement therebetween under a given load depending upon the angle between said strips.

Figure 10:
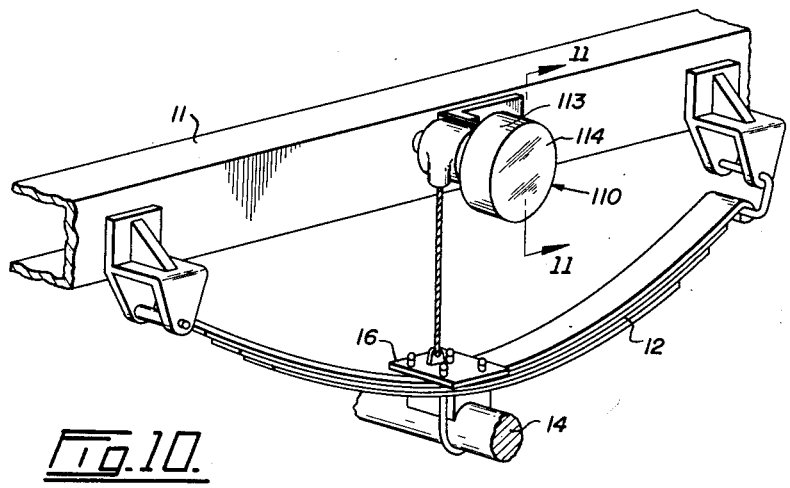
Figure 12:
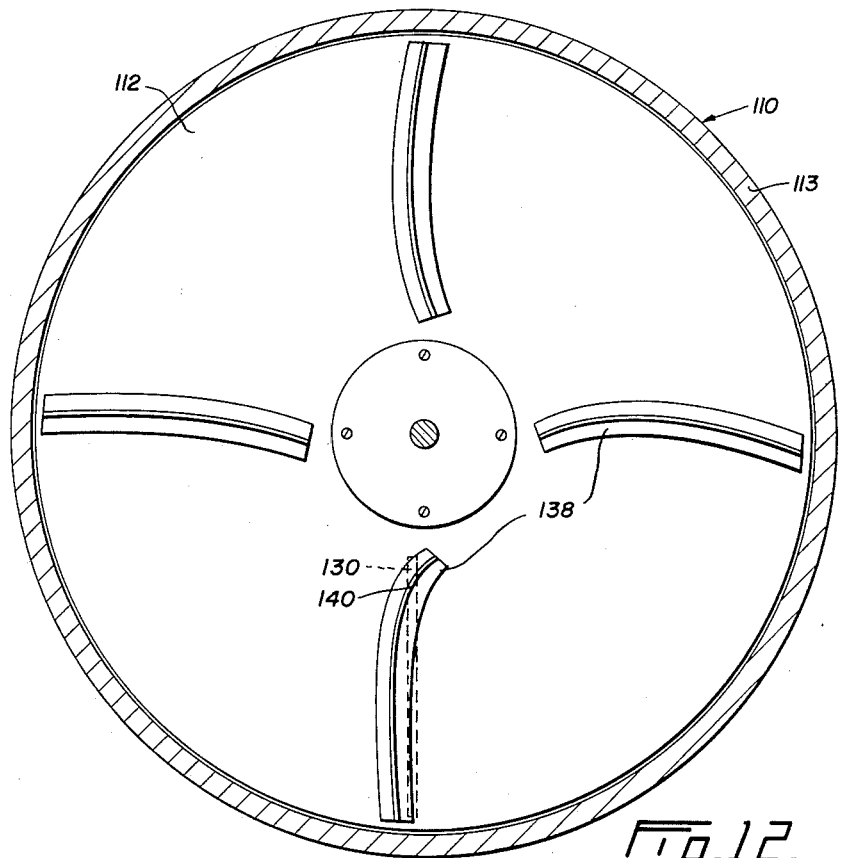
Figure 14:
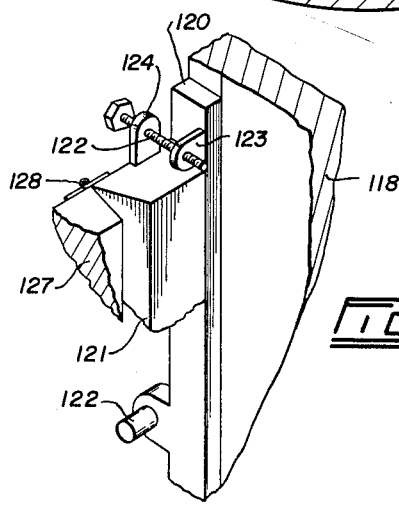

Examples of this invention are illustrated in the accompanying drawings, in which, FIGURE 1 is a perspective view of a portion of a vehicle with the load indicator apparatus mounted thereon, FIGURE 2 is a horizontal section taken on the line 2—2 of FIGURE 1, FIGURE 3 is a cross section taken on the line 3—3 of FIGURE 2, FIGURE 4 is a cross section taken on the line 4—4 of FIGURE 2, FIGURE 5 is a longitudinal section taken on the line 5—5 of FIGURE 2, FIGURE 6 is a flat layout diagrammatically illustrating the relationship between the contact and resistance strips, FIGURE 7 diagrammatically illustrates an electrical measuring circuit for the load indicator apparatus, FIGURE 8 is a diagram illustrating the effect of different relative movements of the contact and resistance strips, FIGURE 9 is a diagram similar to FIGURE 8 relative to an alternatively shaped contact strip, FIGURE 10 is a perspective view of an alternative form of the invention, FIGURE 11 is a vertical section taken on the line 11—11 of FIGURE 10, FIGURE 12 is a cross section taken on the line 12—12 of FIGURE 11, FIGURE 13 is a fragmentary cross sectional view taken on the line 13—13 of FIGURE 11, and FIGURE 14 is a fragmentary sectional view of a portion of the supporting means of the resistance strip in the alternative of FIGURE 10.

Referring to FIGURE 1, of the drawings, load indicating apparatus 10 is shown mounted on the side of a frame member 11 of a truck. This frame member is supported in the usual manner by resilient spring means, such as a spring 12 which is connected to an axle 14 of the vehicle. A plate member 16 is carried by spring 12 immediately beneath indicator apparatus 10.

Apparatus 10 includes a carrier drum 20 having an open outer end 21. This drum is connected to and projects outwardly from a hub 23 at its opposite end. This hub is rotatably supported on a shaft 25 by means of suitable bearings 26. Drum 20 is rotatably mounted in and clear of a cylindrical housing 28, said housing being made up of a removable section 29 mounted on and projecting outwardly from a stationary section 30. Section 29 is removably secured to section 30 by means of bolts 31. Housing section 30 is formed with a base plate 33 which is mounted on frame member 11 in any suitable manner, such as by bolts 34. Shaft 25 is carried by stationary drum section 30 and extends centrally thereof a little way into removable section 29, see FIGURE 2.

A cable 38 is wound on hub 23 and has an end, not shown, fixedly secured thereto, said cable extending downwardly through an outlet 39 formed in drum section 30.

The outer or free end of cable 38 is connected to plate member 16, as indicated at 40 in FIGURE 1. A clock spring 43 is wound around shaft 25 and has an inner end connected to the shaft, and an outer end connected to the hub. Spring 43 is wound so that it has a tendency to turn hub 23 to draw cable 38 into said hub, and this is resisted by the connection of the cable to plate member 16.

A support 44 is fixedly mounted in drum 20 and extends longitudinally thereof. In this example, support 44 is connected to a head 46 which is removably secured to an annular flange 47 carried by section 29 of housing 28 near the free end 21 of drum 20. The head is connected to the flange in any suitable manner, such as by bolts 48. The support 44 extends into and longitudinally of drum 20, and has a bearing 50 on its free end adapted to fit on to the inner end of shaft 25. Support 44 extends laterally generally diametrically of drum 20, and has a flange 52 extending along its upper edge. A support plate 54 extends along the free edge of flange 52 and is connected thereto by a hinge 55 so that said plate can swing from a horizontal position to a downwardly-inclined position, as seen in FIGURE 3. A spring 57 is secured to the outer edge of plate 54 at one end, and at its opposite end to a lug 58 projecting from support 44. This spring normally swings support plate 54 into its downwardly-inclined position, and this position is determined by a bevel 59 along the inner edge of the said support plate.

A solenoid 62 is mounted on a bracket 63 which is carried by support 44 and head 46. A spring arm 65 is pivotally mounted at 66 on a bracket 67, said arm having an end 68 extending over the core of solenoid 62. The opposite end 69 of said arm 65 is adapted to bear against the undersurface of support plate 54. Then solenoid 62 is energized, arm end 68 is attracted to the solenoid core, thus raising the free end 69 of said arm 65 moving support plate 54 into a substantially horizontal position. A resistance strip 72 is mounted on plate 54 and extends longitudinally thereof, said resistance strip projecting laterally beyond the free edge of plate 54 to engage the inner surface of drum 20 when the support plate is in the horizontal position, as shown in FIGURE 3. When solenoid 62 is de-energized, spring 57 draws plate 54 downwardly, swinging resistance strip 72 downwardly and clear of the adjacent drum surface.

Resistance strip 72 extends longitudinally of drum 20 along the inner surface thereof. Solenoid 62 may be energized to swing the resistance strip into engagement with the inner surface of drum 20. A contact strip 74 is mounted on the inner surface of drum 20 and is angled across the plane of resistance strip 72 and extends longitudinally relative to the latter. This resistance strip is clearly seen in the diagram of FIGURE 6. Although the contact strip 74 may be straight in a longitudinal direction, it is preferably curved as shown, and this curve has a relationship to the amount of deflection of spring 12 as the load on the vehicle is increased. The contact strip usually has a curve 76 at one end of relatively short radius, and the strip changes to a curve of longer radius towards its opposite end 77. Although strip 72 may be mounted directly on the surface of drum 20, it is preferably mounted on a plate 78 which in turn is adjustably mounted on the drum surface by bolts 79. With this arrangement, the angle of contact strip 74 relative to resistance strip 72 may be changed by shifting plate 78 on the drum surface.

FIGURE 7 diagrammatically illustrates an electrical measuring circuit 80 in which strips 72 and 74 are connected in series. The circuit includes a suitably calibrated meter 81 which, if the apparatus is used on a truck, may be mounted at any desired point in the truck, such as on the dashboard thereof. FIGURE 7 also shows a circuit 84 including solenoid 62 and an operating switch 85. The solenoid is energized when switch 85 is closed.

The load indicating apparatus 10 is provided on the truck at each end of each axle where it is desired to have an indication of the loading of the axle. As the load is applied to the truck, frame member 11 moves downwardly relative to plate member 16, at which time spring 43 rotates drum 20 to move contact strip 74 in a direction normal to resistance strip 72, as indicated by arrow 87 in FIGURE 6. When it is desired to indicate the loading on meter 81, switch 85 is closed to energize solenoid 62 which, in turn, moves resistance strip 72 into engagement with contact strip 74. There is only a point contact between these two strips, as indicated at 88 in FIGURE 6. The reading on meter 81 depends upon the position of contact 88 between the strips 72 and 74. As strip 74 moves towards strip 72, contact 88 moves along said strips towards the end 77 of the contact strip. This changes the resistance in circuit 80 thereby changing the reading matter on meter 81.

The diagram of FIGURE 8 illustrates how units of load affect contact 88 between strips 72 and 74. Horizontal lines 90 to 96 indicate the deflection of the resilient means or springs 12 as each unit of load is placed on the truck. For example, the unit of load may be 500 pounds. When the first 500 pounds is placed on the truck, the relative movement between strips 72 and 74 is indicated by lines 90 and 91. When the second unit of load is applied to the truck, the deflection is from line 91 to line 92, which is less than the deflection between lines 90 and 91. The last unit of load is indicated by lines 95 and 96. It will be noted that the amount of deflection as the last unit of load is applied is considerably less than that when the first unit of load is placed on the truck. In actual practice, the amount of deflection for the last unit of load is minute, and this is what causes mechanical amplifying devices to fail.

In FIGURE 8, vertical lines 98 to 104 represent the movement of contact point 88 along resistance strip 72. It will be noted that although the spacing between lines 90 to 96 varies, the spacing between vertical lines 98 to 104 remains constant. Thus, although the movement indicated by lines 95 and 96 is very little, the horizontal movement indicated by lines 102 and 104 is the same as that between the other vertical lines. Thus, the amount of deflection of the springs is progressively magnified so that the readings during the application of the last units of load are just as clear as when the first load units are applied. This is the result of the curve of contact strip 74 which is made according to the deflection of the springs with which the apparatus is to be used.

FIGURE 9 is similar to FIGURE 8 excepting that the curve of contact strip 74 has been changed so that the spacing of vertical lines 98 to 104 gradually increases towards the end 77 of said contact strip. In other words, the degree of magnification is greatly increased for the last unit of loads in order that the truck may be accurately loaded right up to its limit without fear of exceeding that limit.

FIGURES 10 to 14 illustrate an alternative form of load indicator apparatus 110. This is similar to apparatus 10, the main difference being that it has a different support for the contact strip from drum 20.

Apparatus 110 has in place of drum 20 an annular carrier plate 112 which is carried by hub 23 and extends outwardly therefrom in a radial direction. A housing 113 is carried by the stationary section 30 and surrounds support plate 112. A cover 114 is removably mounted on the outer end of said housing.

A support 118, similar to support 44, is mounted in housing 113. Support 118 is fixedly secured to the inner end of shaft 25 and radiates therefrom so that it overlaps support plate 112. Support 118 has a flange 120 extending along an edge thereof, see FIGURES 13 and 14, and an elongated base 121 is pivotally connected midway between the ends thereof to said flange by a pin 122. Base 121 lies substantially parallel with flange 120, but it may be angularly adjusted relative thereto by means of a set screw 122 which is rotatably mounted in a lug 123 projecting from flange 120 and is threaded through another lug 124 projecting from the end of base 121. A support plate 127 is hingedly mounted along an edge thereof on base 121 by means of a hinge 128, and this support plate carries a resistance strip 130 which extends along the plate and projects from an edge thereof towards plate 112. A spring 132 tends to swing strip 130 away from plate 112, and a solenoid 133 when energized, swings the strip towards plate 112.

Plate 112 carries on its inner face one or more contact strips 138 which generally radiate from the centre of the plate. Each strip is curved in the same manner as contact strip 74 described above. Four contact strips 138 are shown in FIGURE 12, each strip being curved in accordance with the deflection of different springs from the other strips.

When the indicator apparatus 110 is mounted on a vehicle in the manner described above in connection with apparatus 10, nut 119 of shaft 25 is loosened and support 118 rotated to move resistance strip 130 into a position extending across a selected contact strip 138, said contact strip being selected for the springs of that particular vehicle. Then nut 119 is tightened so that the action between the selected contact strip 138 and resistance strip 130 is the same as that between contact strip 74 and resistance strip 72 previously described. Thus, indicator apparatus 110 may be used with the springs of any of four different vehicles.

When resistance strip 130 extends over contact strip 138, there is always a contact point 140 therebetween. The initial or at-rest position of the contact may be adjusted by changing the setting of base 121 through set screw 122 relative to support flange 120. Furthermore, this adjustment makes it possible to alter to a certain extent the degree of magnification of the deflection of the springs of the vehicle with which the apparatus is used. Apparatus 110 once it is set up operates in the same manner as apparatus 10.

What I claim as my invention is:

1. Self-compensating load indicator apparatus to be used with first and second members retained apart by resilient means and relatively movable under the influence of a load, said resilient means being such that the relative movement of the members towards each other becomes less per unit of load as the load increases, said apparatus comprising an elongated resistance strip associated and movable with the first member, a contact strip associated and movable with the second member, said contact strip extending angularly across and longitudinally of and contacting the resistance strip, said contact and resistance strips being positioned so that one strip moves throughout substantially the length thereof in a direction substantially normal to one of the strips when there is relative movement between the first and second members, an electrical measuring circuit, and means for connecting said contact and resistance strips in series in the measuring circuit, the amount of movement of the contact between the contact and resistance strips along said resistance strip during relative movement therebetween under a given load depending upon the angle between said strips.

2. Load indicating apparatus as claimed in claim 1 in which the contact strip is curved longitudinally thereof.

3. Load indicating apparatus as claimed in claim 2 in which the curve of the contact strip is shaped in accordance with the deflection of said resilient means under varying loads.

4. Load indicating apparatus as claimed in claim 1 in which the contact strip is curved longitudinally thereof, said curve having a relatively short radius near one end of said strip and changing into a curve of a longer radius towards the opposite end of the strip.

5. Load indicating apparatus as claimed in claim 1 including means for adjusting the angle between the contact and resistance strips to adjust the amount of movement of the contact therebetween under the given load.

6. Load indicating apparatus as claimed in claim 1 including means for selectively moving the resistance strip out of and into contact with the contact strip.

7. Self-compensating load indicator apparatus to be used with first and second members retained apart by resilient means and relatively movable under the influence of a load, said resilient means being such that the relative movement of the members towards each other becomes less per unit of load as the load increases, said apparatus comprising an elongated resistance strip mounted on the first member, a movable contact strip extending angularly across and longitudinally of and contacting the resistance strip, biasing means connected to said contact strip and normally effective to urge said contact strip towards an at rest position when one end thereof is near an end of the resistance strip, actuating means connected to the contact strip and to the second member for moving the contact strip away from its at rest position against the action of the biasing means thereby to produce relative movement between the contact and resistance strips in accordance with relative movement between the first and second members consequent upon variations in the load, said contact and resistance strips being positioned so that one strip moves throughout substantially the length thereof in a direction substantially normal to one of the strips during said relative movement, an electrical measuring circuit, and means for connecting said contact and resistance strips in series in the measuring circuit, the amount of movement of the contact between the contact and resistance strips along said resistance strip during relative movement therebetween under a given load depending upon the angle between said strips.

8. Load indicating apparatus as claimed in claim 2 in which the contact strip is curved longitudinally thereof.

9. Load indicating apparatus as claimed in claim 8 in which the curve of the contact strip is shaped in accordance with the deflection of said resilient means under varying loads.

10. Load indicating apparatus as claimed in claim 7 in which the contact strip is curved longitudinally thereof, said curve having a relatively short radius near one end of said strip and changing into a curve of a longer radius towards the opposite end of the strip.

11. Load indicating apparatus as claimed in claim 7 including means for adjusting the angle between the contact and resistance strips to adjust the amount of movement of the contact therebetween under the given load.

12. Load indicating apparatus as claimed in claim 7 including means for selectively moving the resistance strip out of and into contact with the contact strip.

13. Self-compensating load indicator apparatus to be used with first and second members retained apart by resilient means and relatively movable under the influence of a load, said resilient means being such that the relative movement of the members towards each other becomes less per unit of load as the load increases, said apparatus comprising a drum rotatably mounted on the first member, biasing means connected to the drum and normally effective to urge said drum towards an at rest position, actuating means connected to the drum and the second member for moving said drum away from its at rest position against the action of the biasing means in accordance with relative movement between the first and second members consequent upon variations of the load, a contact strip mounted on a surface of the drum and extending generally longitudinally and angularly relative to the drum, an elongated resistance strip mounted on the first member and extending along said drum surface and across and adapted to contact with said contact strip, said strips being positioned so that the contact strip moves throughout substantially the length thereof across the resistance strip during rotation of the drum away from its at rest position, an electrical measuring circuit, and means for connecting said contact and resistance strips in series in the measuring circuit, the amount of movement of the contact between the contact and resistance strips along said resistance strip during relative movement therebetween under a given load depending upon the angle between said strips.

14. Load indicating apparatus as claimed in claim 13 in which the resistance strip is mounted for movement out of and into engagement with the contact strip, and including means normally retaining the resistance strip out of engagement with the contact strip, and means for moving the resistance strip into engagement with the contact strip.

15. Self-compensating load indicator apparatus to be used with first and second members retained apart by resilient means and relatively movable under the influence of a load, said resilient means being such that the relative movement of the members towards each other becomes less per unit of load as the load increases, said apparatus comprising a carrier plate mounted on the first member for rotation around the axis extending normally to said plate, biasing means connected to the plate and normally effective to urge said plate towards an at rest position, actuating means connected to the plate and the second member for moving said plate away from its at rest position against the action of the biasing means in accordance with the relative movement between the first and second members consequent upon variations of the load, a contact strip mounted on a surface of the plate and extending in a generally radial direction relative thereto, an elongated resistance strip mounted on the first member and extending along said plate surface and across and adapted to contact with said contact strip, said strips being positioned so that the contact strip moves throughout substantially the length thereof across the resistance strip during rotation of the plate away from its at rest position, an electrical measuring circuit, and means for connecting said contact and resistance strips in series in the measuring circuit, the amount of movement of the contact between the contact and resistance strips along said resistance strip during relative movement therebetween under a given load depending upon the angle between said strips.

16. Load indicating apparatus as claimed in claim 15 in which the resistance strip is mounted for movement out of and into engagement with the contact strip, and including means normally retaining the resistance strip out of engagement with the contact strip, and means for moving the resistance strip into engagement with the contact strip.

17. Load indicating apparatus as claimed in claim 15 in which said resistance strip is mounted on a support extending radially of the carrier plate, and including means for rotatably supporting said support near one end thereof at the centre of the plate whereby the support can be adjusted relative to the plate to change the angle of the resistance strip relative to the contact strip, and means for retaining the support in any adjusted position.

18. Self-compensating load indicator apparatus to be used with first and second members retained apart by resilient means and relatively movable under the influence of a load, said resilient means being such that the relative movement of the members towards each other becomes less per unit of load as the load increases, said apparatus comprising a carrier plate mounted on the first member for rotation around the axis extending normally to said plate, biasing means connected to the plate and normally effective to urge said plate towards an at rest position, actuating means connected to the plate and the second member for moving said plate away from its at rest position against the action of the biasing means in accordance with the relative movement between the first and second members consequent upon variations of the load, a plurality of spaced apart independent contact strips mounted on a surface of the plate each extending in a generally radial direction relative thereto, a support movably mounted on the first member to extend over and clear of said plate surface, an elongated resistance strip mounted on said support and extending generally radially along said plate surface, said support being adjustable so that the resistance strip may be moved into a position over and extending across and adapted to contact any selected one of said contact strips, said strips being positioned so that the contact strip moves throughout substantially the length thereof across the resistance strip during rotation of the plate away from its at rest position, an electrical measuring circuit, and means connecting said resistance strip and each of said contact strips in series in the measuring circuit, the amount of movement between the selected contact strip and the resistance strip along said resistance strip during relative movement therebetween under a given load depending upon the angle between said strips.

19. Load indicating apparatus as claimed in claim 18 including means normally retaining the resistance strip out of engagement with said selected contact strip, and means for moving the resistance strip into engagement with said selected contact strip.

20. Load indicating apparatus as claimed in claim 18 in which the contact strips are curved longitudinally thereof, and the curve of each contact strip is different from that of the other contact strips.

21. Load indicating apparatus as claimed in claim 20 in which the curve of the selected contact strip is shaped in accordance with the deflection of said resilient means under varying loads.

22. Load indicating apparatus as claimed in claim 20 in which the curve of each contact strip has a relatively short radius near one end thereof and changes into a curve of a larger radius towards the opposite end of the strip.

23. Self-compensating load indicator apparatus for vehicles having supporting spring means between an undercarriage spaced from a body, the spacing between said undercarriage and body decreasing and increasing as the load on the vehicle increases and decreases, comprising two supporting elements adapted to be connected to the undercarriage and body respectively for relative movement as the spacing thereof changes, an elongated resistor carried by one of said elements, a curved contact strip carried by the other of said elements extending across and longitudinally of and in contact with said resistor, the curve of said contact strip being shaped in accordance with the deflection of the vehicle supporting spring means, an electrical circuit including in series said resistor and contact strip and an indicator, whereby the amount of movement of the contact between the resistor and strip along said resistor increases and decreases as the load on the vehicle increases and decreases.

24. Load indicating apparatus as claimed in claim 23 in which the resistor is mounted for movement out of and into contact with the contact strip, and including means for shifting the resistor into and out of contact with said strip.

25. Load indicating apparatus as claimed in claim 23 including means for adjusting the angle of the resistor to the contact strip.

References Cited in the file of this patent

UNITED STATES PATENTS

| | | |
|---|---|---|
| 1,621,093 | Troll | Mar. 15, 1927 |
| 3,092,818 | Potscka | June 4, 1963 |
| 3,109,505 | Davis et al. | Nov. 5, 1963 |

FOREIGN PATENTS

| | | |
|---|---|---|
| 875,417 | Germany | May 4, 1953 |